US006036815A

United States Patent [19]

[11] Patent Number: 6,036,815

[45] Date of Patent: Mar. 14, 2000

Peterson et al.

[54] PHASED ARRAY WITH INTEGRATED BANDPASS FILTER SUPERSTRUCTURE

[75] Inventors: Carl W. Peterson, Carson; Harry C. Jones, Cerritos; Mir Akbar Ali, Lomita; Gerald W. Swift, Rolling Hills Estates, all of Calif.

[73] Assignee: Hughes Electronics Corporation, El Segundo, Calif.

[21] Appl. No.: 09/070,819

[22] Filed: Apr. 30, 1998

Related U.S. Application Data

[62] Division of application No. 08/585,825, Jan. 12, 1996, Pat. No. 5,781,162.

[51] Int. Cl.[7] ..................... B32B 31/00

[52] U.S. Cl. ..................... 156/330

[58] Field of Search ..................... 156/330

[56] References Cited

U.S. PATENT DOCUMENTS 5,405,476 4/1995 Knecht ..................... 156/292

*Primary Examiner*—Francis J. Lorin

*Attorney, Agent, or Firm*—Georgann S. Grunebach; M. W. Sales

[57] ABSTRACT

A phased array (20) and method for constructing the same are disclosed. The phased array (20) includes a superstructure (22) with cavities (40) therein. A cover plate (28) is mounted to the superstructure (22) and cooperates with the cavities (40) to form cavity style filters therebetween and to form a box-beam type superstructure. Ideally, the superstructure (22) is self supporting. Electronic modules (32) and amplifiers (33) are mounted to the superstructure (22). The method includes machining a block of material to form a webbed superstructure with cavities (40) therein. A cover plate (28) is mounted to the superstructure (22) over the cavities (40) to form cavity style filters. Amplifiers (32) and antenna elements (30) are then affixed to the superstructure (22) and cover plate (28). Ideally, the cover plate (28) is affixed to the superstructure (22) using an electrically conductive adhesive. Preferably, a capacitive probe is inserted into the cavities (40) to electrically couple the filters to the antenna elements (30) and amplifiers (33).

2 Claims, 8 Drawing Sheets

FILTER PASSBAND RESPONSE

FILTER REJECTION

FILTER RETURN LOSS

FILTER PASSBAND AND RETURN LOSS

FILTER REJECTION OVER TEMPERATURE

PHASED ARRAY WITH INTEGRATED BANDPASS FILTER SUPERSTRUCTURE

This is a Divisional of U.S. application Ser. No. 08/585,825, filed Jan. 12, 1996, now U.S. Pat. No. 5,781,162.

TECHNICAL FIELD

This invention relates to phased arrays having bandpass filters.

BACKGROUND OF THE INVENTION

The current approach used to construct space based phased arrays is to first design a large planar structural member, possibly of a honeycomb material. Thousands of various components including bandpass filters, radio frequency (RF) electronics modules and control circuits are then tested. If acceptable, the components are mounted onto this structural member. Typically, connections between electrical components are made using coaxial cables. This conventional approach to phased array construction, while straight forward, is highly labor intensive and expensive.

With respect to RF filters, these filters could be any coaxial or waveguide bandpass or bandstop filters. Such filters are often metallic structures having cavities and curves of a predetermined shape and are conventionally secured together by dip brazing or by screw type metal fasteners.

The prior art for the assembling of RF filters is to use metallic screws which act as fasteners keeping a lid in contact with filter cavities. This assembly method is a cumbersome, time consuming and costly involving fine machining and polishing of contact surfaces for a much desired highly conductive seal. Further, the use of numerous screws as fasteners for each filter adds unnecessary weight to the overall structure of a phased array.

Commercial adhesives which are electrically conductive are known. However, their electrical conductivity has much to be desired. The quality and quantity of the metallic filler materials in the adhesives has been found to be low. Also, these commercial adhesives have relatively high electrical losses.

One example is found in U.S. Pat. No. 5,180,523. This patent discloses an electrically conductive cement adhesive filled with silver. The cement adhesive is not described as being for space applications. Further, the cement adhesive has a high shrinkage due to its epoxy resin and also has outgassing characteristics. The outgassing of organic gases into the space environment is unsafe and prohibitive.

The present invention is intended to overcome the above recited shortcomings of conventional space based phased arrays. Also, the present invention may utilize an electrically conductive adhesive cement which improves upon certain characteristics of previous electrically conductive adhesive cements.

SUMMARY OF THE INVENTION

It is an object of the present invention to provide an integrated phased array which employs a superstructure for the support of electrical components mounted thereon and which uses the bandpass filters of the array to form the superstructure.

It is another object to provide a superstructure which may be made from a machined block of material and has cavities configured to a predetermined shape to serve as part or all of cavity style bandpass filters required by the array.

Another object is to provide a phased array which is lighter and more economical to make than conventional phased arrays of similar size due to the integration of bandpass filters into the superstructure of the array.

An additional object is to improve the electrical performance of a phased array by replacing conventional cable connections with plug-in modules and plug-in antenna elements.

Still yet another object is to provide an improved electrically conductive adhesive for structurally and electrically connecting components of an integrated phased array.

In accomplishing these objects, a phased array is provided comprising a superstructure, a cover plate, antenna elements and electronic modules. The superstructure is preferably self-supporting and includes web portions and base portions defining a plurality of cavities. A cover plate mounts to the superstructure. The cavities and cover plate cooperate to form a plurality of cavity style filters. The antenna elements and electronic modules provide electrical inputs and outputs relative to the cavities. The web portions and base portions of the superstructure cooperate to form at least a portion of the cavity style filters while also cooperating to provide the primary structural support for the array.

Ideally, the superstructure is integral and is machined from a block of material such as aluminum. Also, ideally the antenna elements and electronic modules are electrically coupled to the cavities without use of coaxial cables. Potentially, probes on the antenna elements and electronic modules are inserted or plugged into the cavities of the superstructure to form capacitive couplings. Further, the cover plate may be joined to the superstructure using an electrically conductive adhesive.

BRIEF DESCRIPTION OF THE DRAWINGS

These and other features, objects, and advantages of the present invention will become readily apparent from the following description, pending claims, and accompanying sheets of drawings where:

BEST MODE FOR CARRYING OUT THE INVENTION

Figure 1:
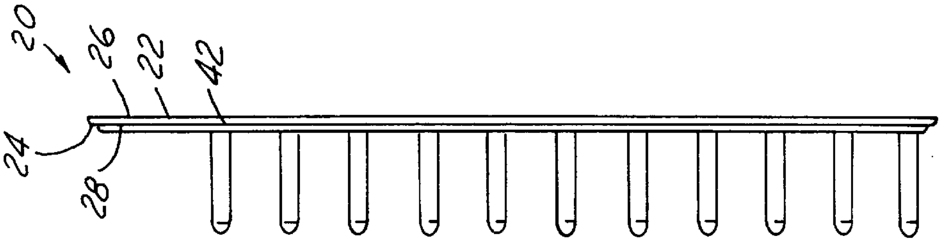
FIG. 1 is a side elevational view of an integrated phased array made in accordance with the present invention.

An exemplary phased array 20, made in accordance with the present invention, is shown in FIG. 1. Array 20 includes a generally planar superstructure 22 having a front side 24 and a rear side 26. A cover plate 28 is preferably adhesively secured to the front side of superstructure 22. Mounted onto cover plate 28 are a plurality of radiating or receiving antenna elements 30. Electronic modules 32 are affixed to the rear side 26 of superstructure 22 and may include control circuitry and other devices. Solid state power amplifiers (SSPA) and/or Low Noise Amplifiers (LNA) 33 are also mounted to the rear of superstructure 22. A plurality of heat pipes 34 may run through array 20 to maintain array 20 at a desired temperature.

Superstructure 22 is comprised of many web portions 36 and base portions 38 forming generally rectangular cavities 40. Column-like posts 41 also partially form cavities 40. Cavities 40 and overlying cover plate 28 cooperate to form a plurality of cavity style bandpass filters. An electrically conductive adhesive 42 is used to secure cover plate 28 to superstructure 22.

Figure 4A:
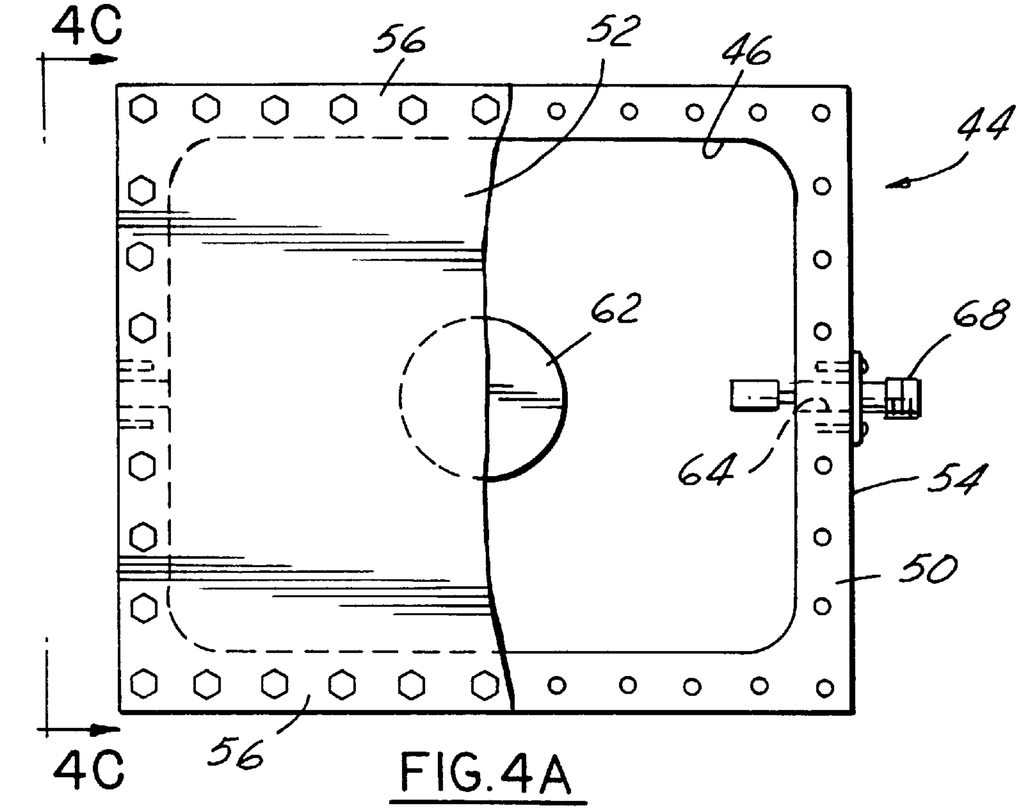
FIGS. 4A, B, and C are respective top, side and end elevational views of a test filter apparatus having a single cavity.
Figure 4B:
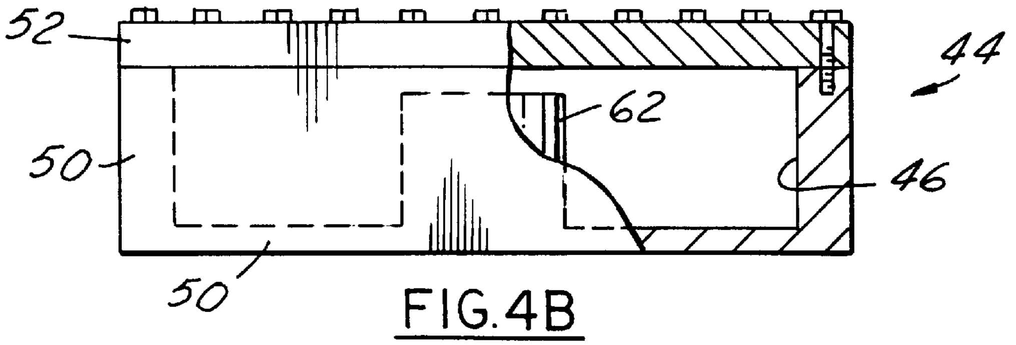
Figure 4C:
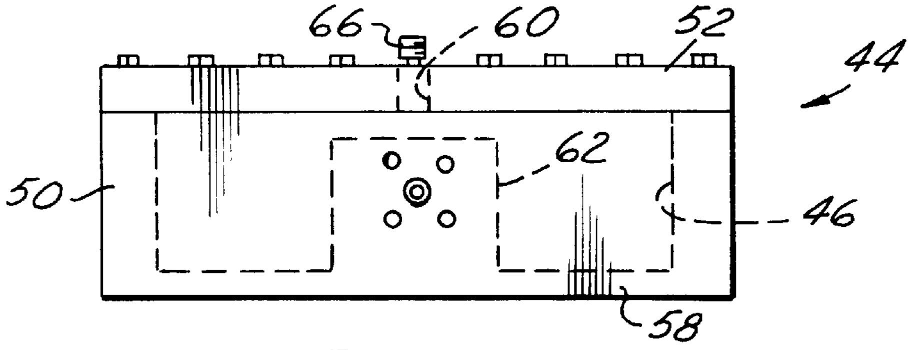
Figure 5A:
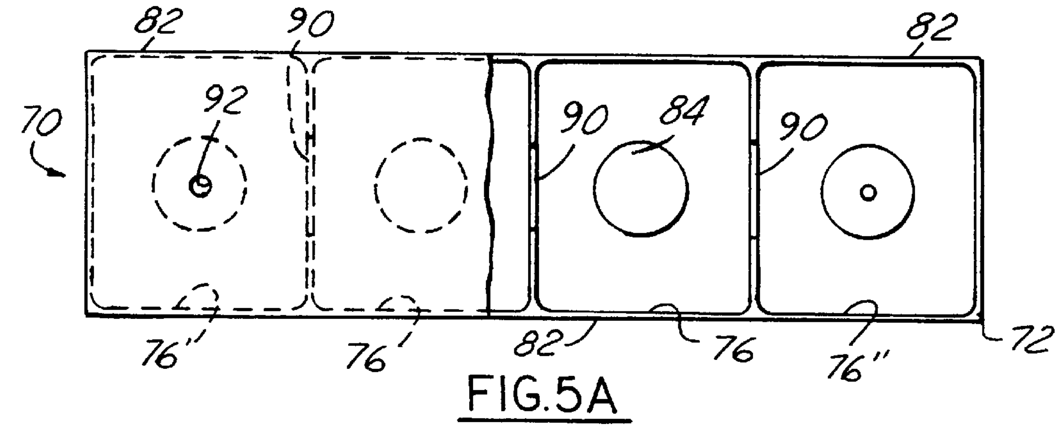
FIGS. 5A, B, C and D are respective top, front, bottom and side elevational views of a second test filter apparatus having four longitudinally aligned cavities.
Figure 5B:
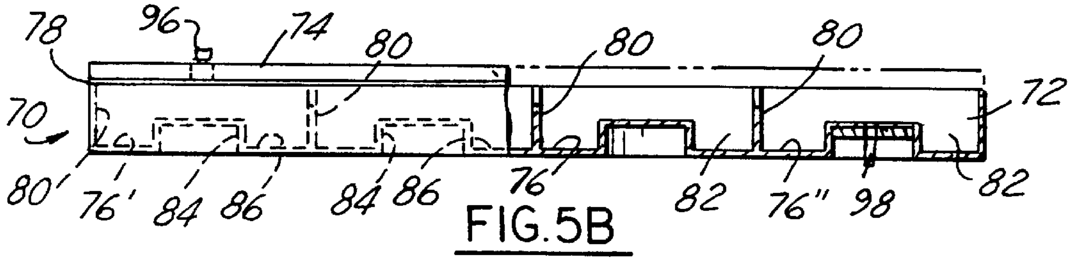
Figure 5C:
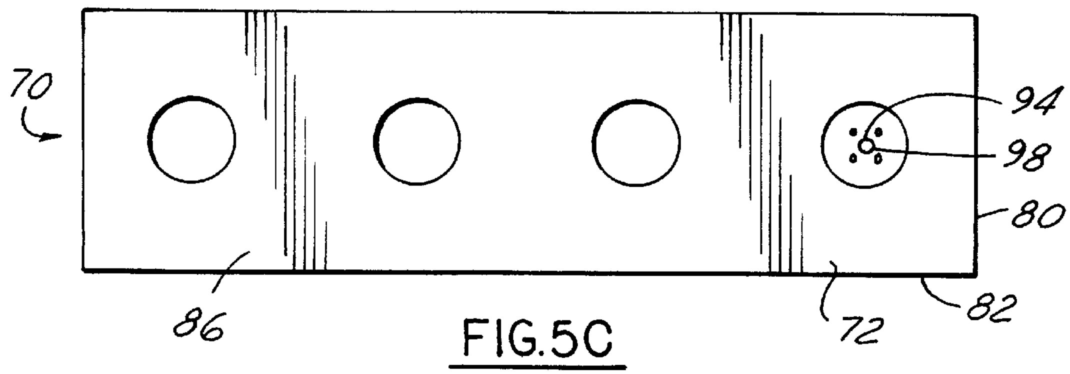
Figure 5D:
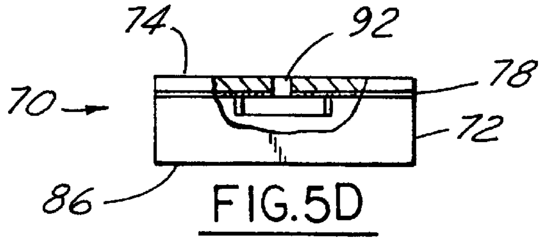

An exemplary test filter apparatus 44, as shown in FIGS. 4A–C, was constructed to determine the appropriate size and shape for a desired cavity style bandpass filter. Test filter apparatus 44 includes a single cavity 46 defined within a superstructure 50. A cover plate 52 is attached to superstructure 50 using numerous threaded fasteners. In this example, web portions 54 and 56, respectively, are approximately 4 and 3.5 inches in length, 1 inch high and 0.250 inches thick. A base portion 58 forms the floor of superstructure 50. Cover plate 52 has a central aperture 60 therein. Cover plate 52 is approximately 0.250 inches thick and central aperture 60 has a diameter of 0.166 inches. A centrally disposed hollow post 62, 0.850 inches high and 0.875 inches in diameter, is formed in base portion 58. A laterally extending aperture 64 is placed in web portion 54 as shown. Respective input and output capacitive couplings 66 and 68 are installed in apertures 60 and 64 for electrical testing purposes. Couplings 66 and 68 electrically couple with respective cover plate 52 and web portion 54. For test purposes, test cables were attached to couplings 66 and 68 to input and receive signals.

Figure 3:
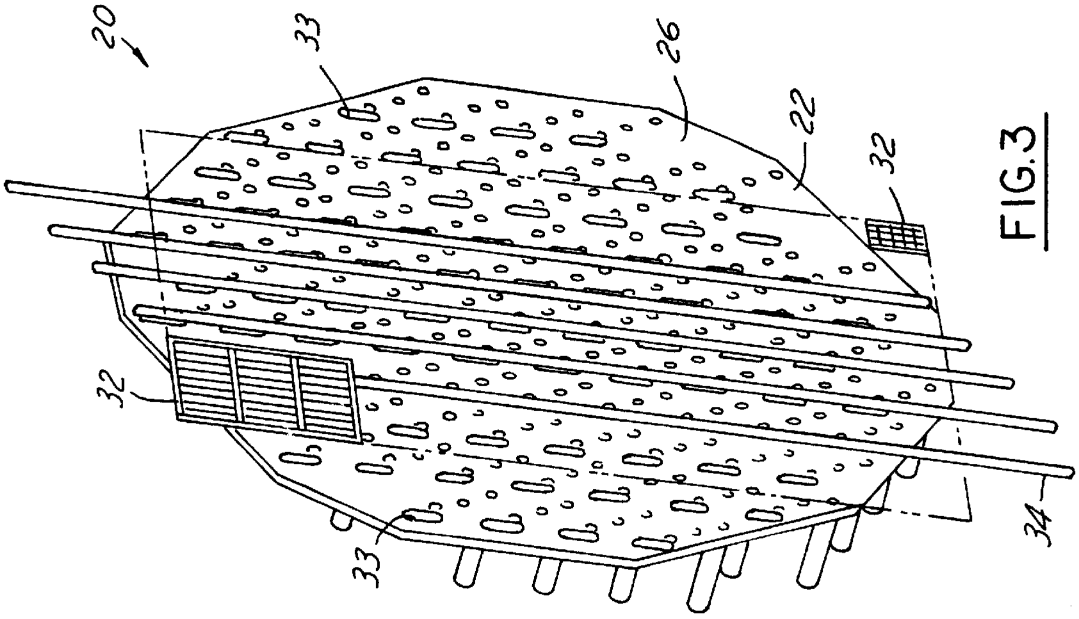
FIG. 3 is a rear perspective view of the phased array of FIG. 1.
Figure 2:
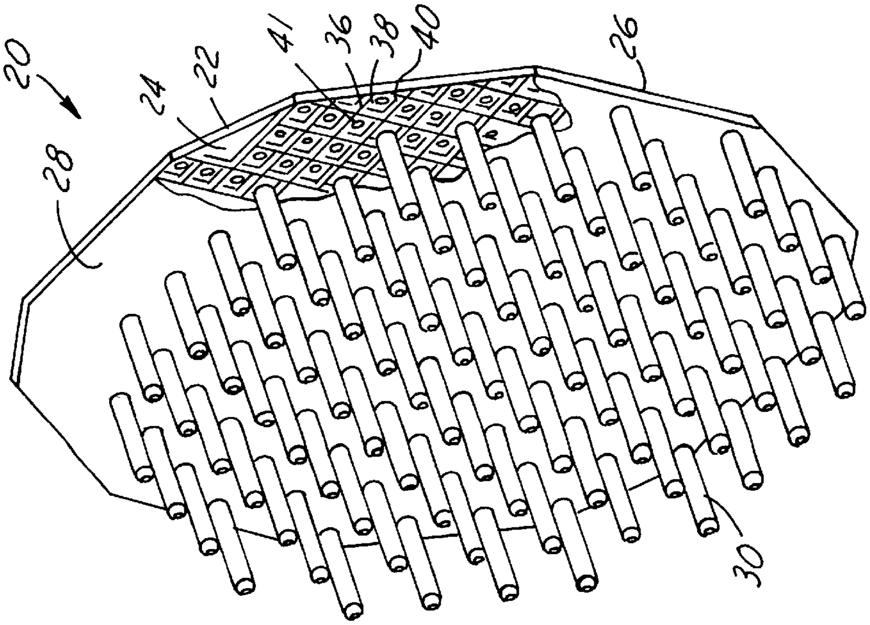
FIG. 2 is a front perspective view of the phased array of FIG. 1.

Tests conducted showed test apparatus 44 performed well as a cavity whose configuration later was used in a multi-cavity style bandpass filter. However, without the presence of post 62, cavity 46 was tuned well above the desired center frequency of the bandpass filter. Consequently, post 62 was used in the center of superstructure 50 to lower the resonant frequency of test filter apparatus 44 to a desired operating frequency. Individual test apparatus 44 of FIGS. 4A–C was used to determine the dimensions of a typical post which is used in array 20 of FIGS. 1–3.

As will be appreciated by those skilled in the art, these aforementioned dimensions are used by way of example, and not limitations, and may be varied to achieve desired filter results. Furthermore, the cross-sectional shape of a cavity need not be restricted to a rectangular shape—for example, hexagonal or triangular cross-sectional shapes will also work well.

FIG. 5 shows a test filter apparatus 70 having a superstructure 72 with an overlying cover plate 74. Superstructure 72 has four rectangular cavities 76 aligned in a longitudinal row. The leftmost cavity 76' serves as an input cavity while the rightmost cavity 76" is employed as an output cavity. An electrically conductive adhesive 78, which will be described in greater detail below, is used to mechanically and electrically connect cover plate 74 to superstructure 72.

Each cavity 76 is defined by web portions 80 and 82, a central hollow post 84 and a base portion 86. Communication irises 90 are disposed in the interior web portions 80 to provide communication between adjacent cavities 76. Above and below input and output cavities 76' and 76" are apertures 92 and 94 in respective cover plate 74 and base portion 86. Input and output capacitive couplings 96 and 98 provide electrical input and output to cavities 76' and 76". Preferably, couplings 96 and 98 are female couplings for directly receiving male leads or probes from test equipment.

Superstructure 72 is designed by determining the element spacing and dividing the available area equally among the number of desired filter cavities 76. As much material as possible is designed out of the superstructure 72, leaving rectangular compartments formed between base portions 86 and cover plate 74 to serve as resonators.

A capacitive probe (not shown) is inserted directly into female output coupling 98 to receive a filtered signal. This feature facilitates integration of phased array electronics modules and amplifiers to the rear side of test filter apparatus 70. This eliminates the requirement for additional cabling.

Figure 8:
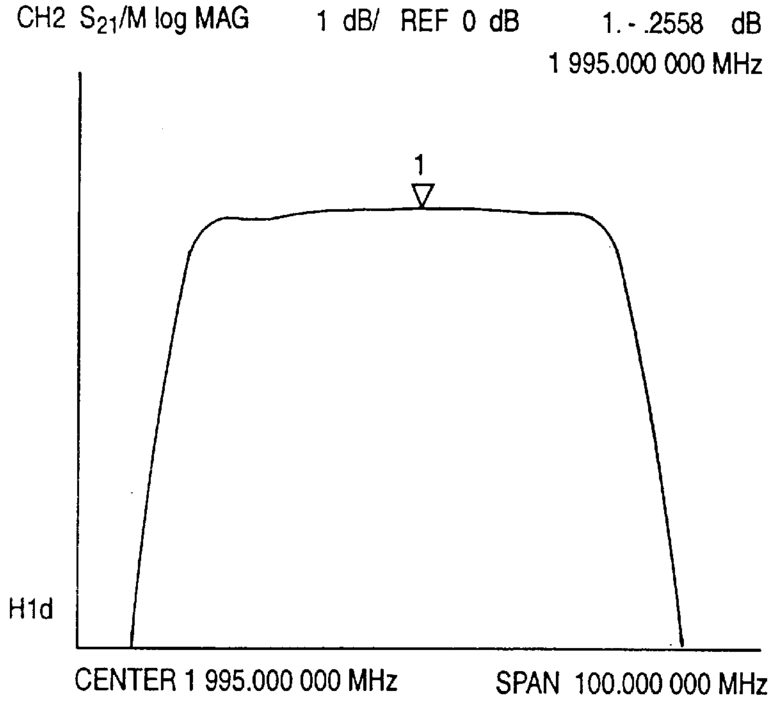
FIG. 8 is a graph of the filter passband response of the filter apparatus of FIG. 5.
Figure 9:
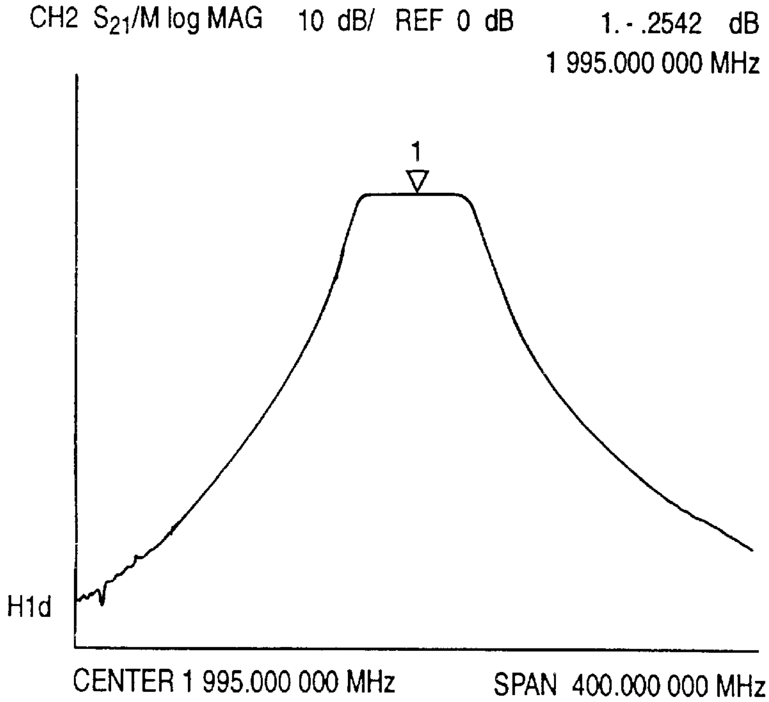
FIG. 9 is a graph of the filter rejection of the filter apparatus of FIG. 5.
Figure 10:
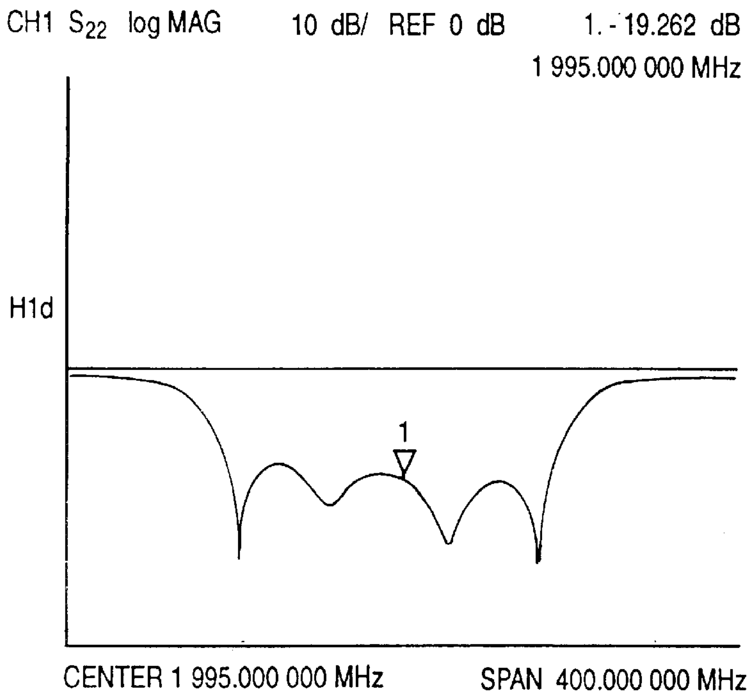
FIG. 10 is a graph of the filter return loss of the filter apparatus of FIG. 5.

Test filter apparatus 70 was fabricated without the use of silver plating on cavities 76 which may be used in cavity style bandpass filters to reduce loss. FIG. 8 shows the passband response of the filter provided by test filter apparatus 70. The insertion loss of this prototype filter was 0.25 dB. FIG. 9 illustrates the rejection of the filter and FIG. 10 shows the filter's corresponding return loss. Accordingly, by replicating this prototype filter design containing four cavities 76 in a superstructure 22, a much larger phased array 20, such as that shown in FIGS. 1 to 3, can be formed by utilizing cavities 40 of superstructure 22 as component parts of the bandpass filters.

Figure 6A:
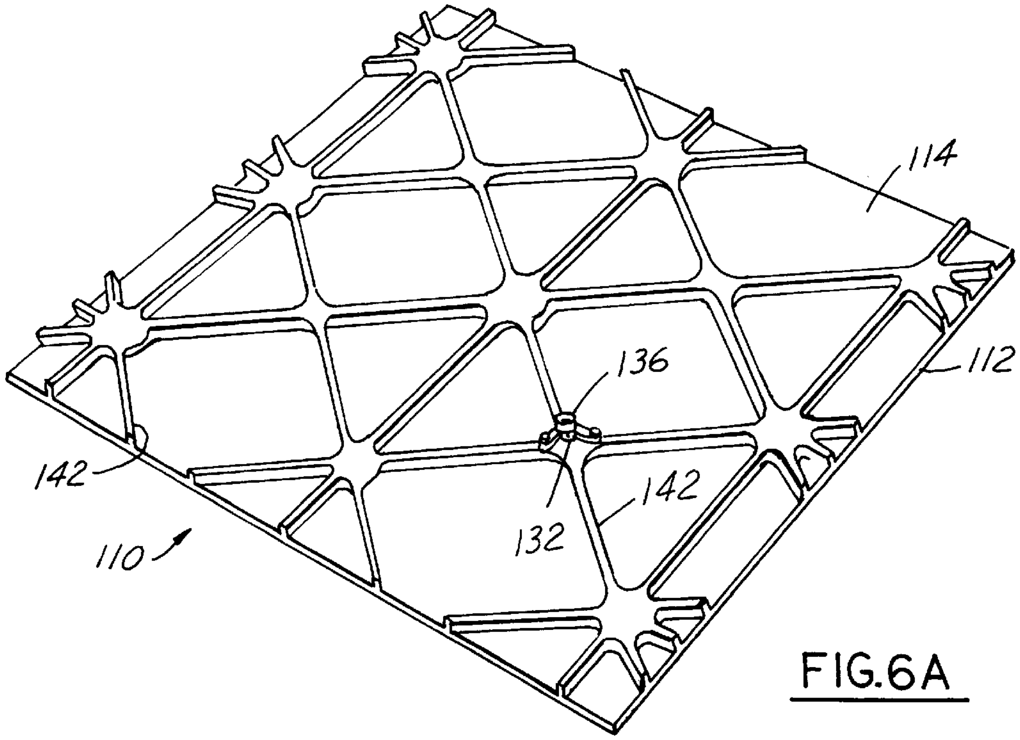
FIGS. 6A and B are top and bottom perspective views of a third test filter apparatus having four cavities arranged in a 2×2 matrix.
Figure 6B:
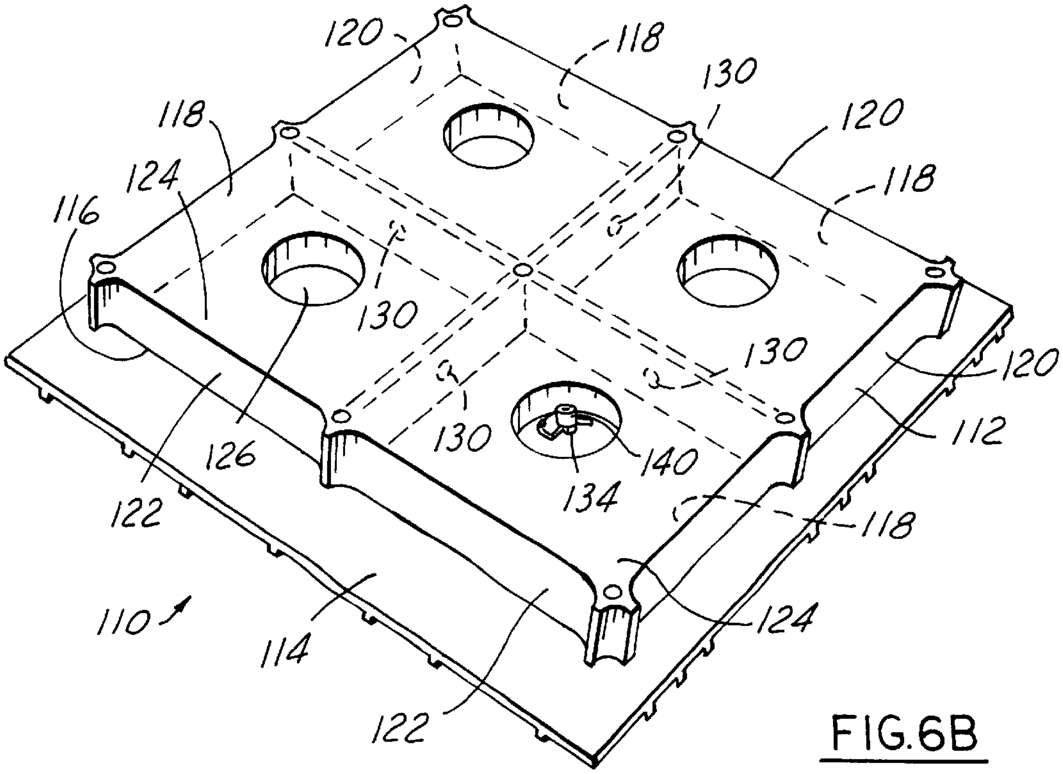

A second embodiment of a four cavity test filter apparatus 110, also made in accordance with the present invention, is shown in FIGS. 6A and 6B Test filter apparatus 110 includes a superstructure 112 which has an overlying cover plate 114 with an intermediate layer of electrically conductive adhesive 116. Cavities 118 are arranged in a 2×2 matrix formation. Superstructure 112 includes web portions 120 and 122, base portions 124 and posts 126. Again, adjacent cavities 118 are coupled by communication irises 130 formed in web portions 120 and 122. Apertures 132 and 134 are formed in respective cover plate 114 and in hollow post 126 of base portion 124. Input and output capacitive couplings 136 and 140 are disposed in respective apertures 132 and 134. Again test cables (not shown) are coupled to couplings 136 and 140 for test purposes. As can be noted in FIG. 6A, cover plate 114 includes ribs 142 therealong to enhance its structural rigidity.

Because of the 2×2 matrix arrangement with irises 130 formed in interior webs 120 and 122, a closed loop is formed by the cavities with a cross-coupled filter topology being achieved. The above described test filter apparatus 70 and 110 of FIGS. 5 or 6 can be any cavity style or waveguide bandpass or bandstop filter made from a suitable material, such as aluminum.

Figure 11:
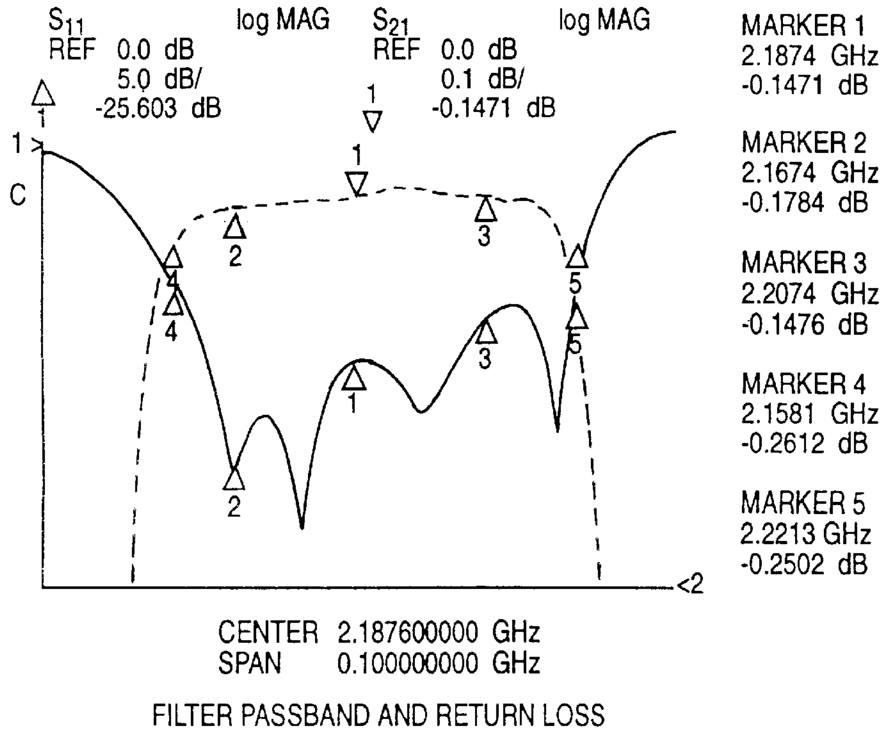
FIG. 11 is a graph of the passband and return loss of the filter apparatus of FIG. 6.
Figure 12:
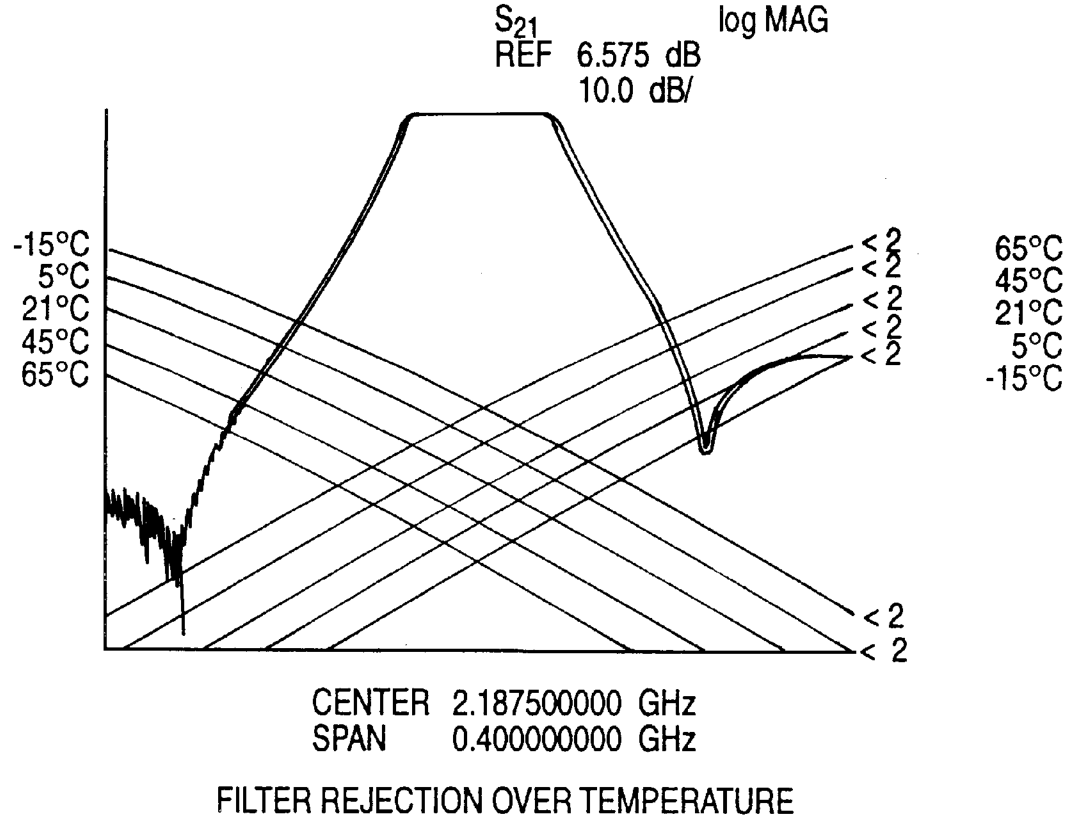
FIG. 12 is a graph of the filter rejection over temperature of the filter apparatus of FIG. 6.
Figure 13:
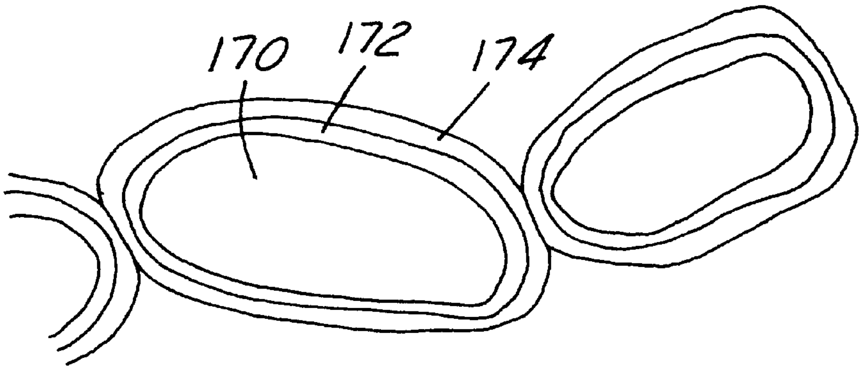
FIG. 13 is a schematic representation of current flow through a metal-filled polymer.

FIG. 11 shows the insertion loss of test filter apparatus 110 at midband to be only 0.15 dB. Also, this filter is well behaved over temperature. A plot of the filter rejection over temperature is shown in FIG. 12. Note that the change in frequency response is barely perceptible. Thus the test data shows that conductive adhesive 116 provides an electrical RF connection comparable to other commonly used fabrication techniques.

Figure 7:
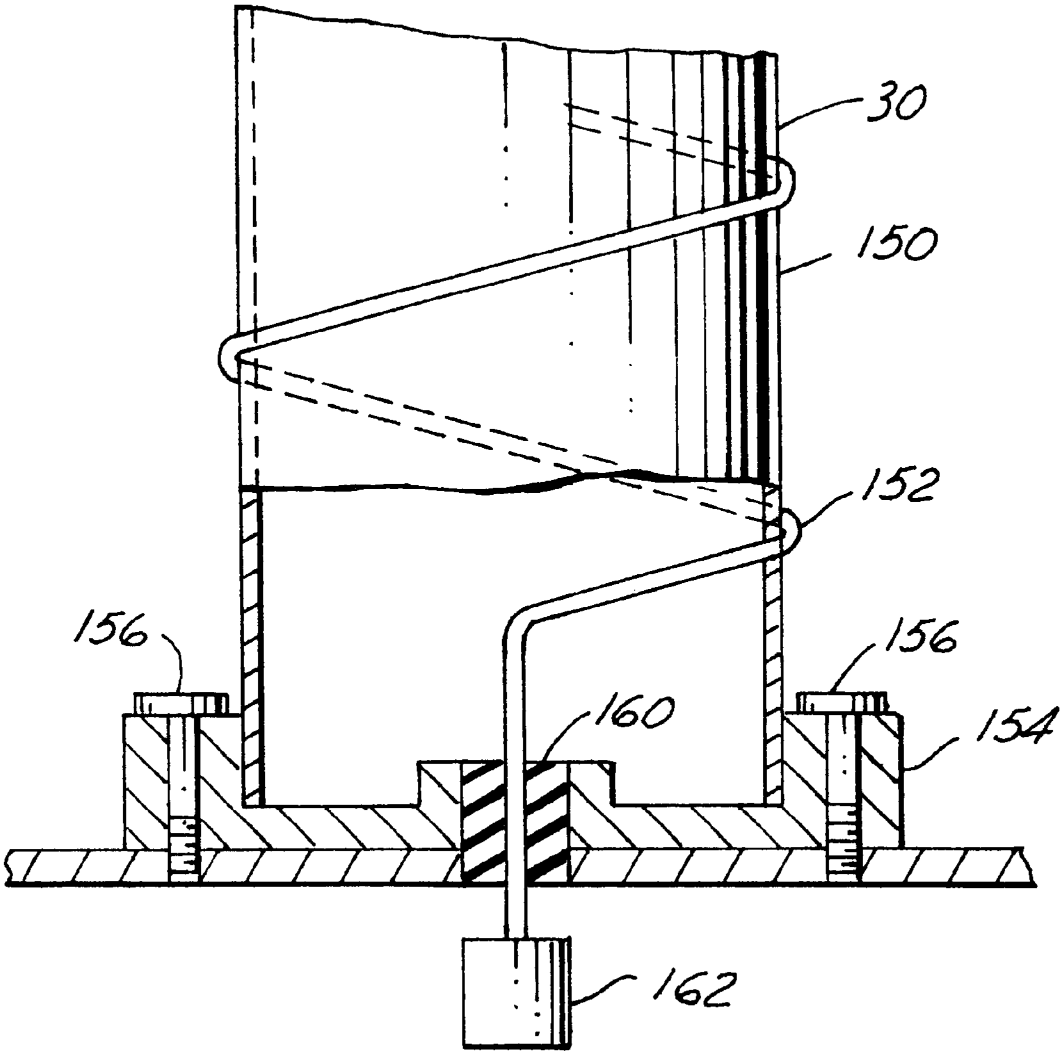
FIG. 7 is a sectional view of an antenna element electrically coupling through a cover plate to a cavity.

FIG. 7 shows an exemplary connection between an antenna element 30 and cover plate 52 which may be used with array 20. Antenna element 30 has a main insulated column 150 about which a lead 152 is coiled. A mounting flange 154 retains antenna element 30 with fasteners 156 securing mounting flange 154 to cover plate 52. An annular column 160 of insulating material, such as Teflon, separates lead 152 from mounting flange 154. Lead 152 terminates in an enlarged cylindrical end 162 which is disposed within cavity 40 beneath cover plate 52. A capacitive coupling is formed between cylindrical end 162 and the surface of cavity 40 and the inside surface of cover plate 52. Accordingly, antenna element 30 simply plugs into an aperture in cover plate 52 to form an electrical coupling with mounting flange 154 securing to cover plate 52 using fasteners 156 to mechanically mount antenna element 30.

In the construction of array 20 of FIG. 1, ideally superstructure 22 is initially a large flat block of material, such as 6061T6 aluminum, which is machined to give cavities 40 and hollow posts 41 the same general dimensions as the test cavity 46 and post 62 in FIGS. 4A–C. Alternatively, superstructure 22 could be fabricated using welded plates, although this is not preferred. Hundreds or thousands of cavities 40 may be machined into a single block forming the integrated superstructure 22. Also, in array 20, cavities 40 may be silver plated to enhance their performance as bandpass filters, if necessary to meet performance criteria. Ideally a single cover plate 28 with apertures therein would be mounted over superstructure 22. These apertures preferably receive leads integrally formed on antenna elements 30 to form capacitive couplings. Likewise, formed in rear side 26 of superstructure 22 are apertures which retain corresponding leads from amplifiers 33. Communication irises, similar to irises 90 or 130, can be formed in web portions 36 to place cavities 40 in communication with one another such that a bandpass filter is formed for each antenna element 30. In exemplary array 20, there is one antenna element 30 for each four cavities 40 with corresponding irises therebetween to form a filter similar to test apparatus 110.

Antenna elements 30, such as receive or transmit elements, preferably all mount on a single side, such as to cover plate 28 of array 20. Preferably, antenna elements 30 have male leads which can directly insert within cavities 40 without need for further electrical interconnections such as coaxial cables. Likewise, LNA's or SSPA's ideally mount on the opposite face or rear side 26 of superstructure 22. The use of capacitive couplings (not shown) again allows phased array amplifiers 33 to integrate directly to the filters or cavities 40. The above-described features not only further reduce weight, but also improve electrical performance of the system in that circuit losses due to interconnecting cables are eliminated.

As described above, cover plate 28 of array 20 is preferably joined to superstructure 22 using an electrically conductive adhesive 42. Adhesive 42 is a low loss metal-polymer electrically conductive adhesive. The use of adhesive 42 eliminates the use of electro-form parts, dip-brazing and the use of metal screws. Accordingly, adhesive 42 reduces the weight of array 20 and the final cost of assembling. Further, the use of this electrically conductive polymer results in a more secure bond.

The metal-containing electrically conductive polymeric adhesive 42 of this invention is preferably anisotropic having the ability to conduct electrical current in the Z-direction or perpendicular to planar surfaces being joined together. Such a characteristic is valuable in the bonding/sealing of cover plate 28 to superstructure 22 forming the RF filter.

Among commercial polymer systems, there are a family of commercial dysfunctional bisphenol/epichlorohydrin-derived liquid epoxy resin systems that have a very low dielectric loss and insignificant outgassing characteristics. The polymers can be effectively blended with highly conductive metal flakes or powders such as silver and gold to form thin layers of metal-polymer electrically conductive adhesives. In the presence of an appropriate curing agent, such adhesives, when baked around 350° F., harden to form an air-tight seal between joined components.

By a careful control of the starting polymer and conductive metal particles and processing techniques, electrical conductance can be achieved in the Z-direction. The base resin or polymer used to make the exemplary adhesive 42 is a polymer from the Epon family identified by the industrial designation Epon 828. Epon 826 or 816 could also be used. Also included in the resin system of adhesive 42 is a commercial curing agent such as Epon 3140 or Epon W. Both the curing agents and polymers are available from Shell Chemical of Houston, Tex. The quantity of the curing agent is in the range of resin:curing agent =100:70 parts by weight.

Conductivity of a metal is a function of the degree of mobility of free electronics associated with the physical entity. The best electrical conductors are metals and the elements of Group 1B of the periodic table. Silver, gold and copper are extensively used by the microelectronics industry due to the ease with which they release a single electron from their outermost shells. Most metals have a positive temperature coefficient resistivity—an increase in the temperature results in a decrease in the electrical conductivity. In the case of precious metals, specially, silver (Ag), gold (Au) and palladium (Pd) the effect is not as significant within a wide range of temperature. This is one of the key reasons as to why precious metals play a significant role as conductors in the microelectronics industry. For these reasons silver and gold were selected as the conductive materials for the development of metal-polymer conductive pastes. The following table compares the physical properties of silver and gold:

| | 1 | 2 | 3 | 4 | 5 | 6 |
|---|---|---|---|---|---|---|
| Silver | 107.87 | 10.50 | 961 | 1.58 | 4.77 | 19.5 |
| Gold | 1096.97 | 19.31 | 1063 | 2.40 | 3.15 | 14.3 |

where,
1 = Atomic weight
2 = Density, grams/cc
3 = Melting point, degrees C.
4 = Resistivity, micro ohms/cm @ 20 C.
5 = Thermal conductivity, Cal (gm) Hr/cm/C.
6 = Coefficient of thermal expansion, (10 −6)/(C.)

FIG. 12 shows the anticipated mechanism for the current flow through a metal-filled polymer. If enough metal particles 170 are added to form a network within the polymer matrix, electrons can flow across the particle contact points making the mixture electrically conductive. FIG. 12 also illustrates the resistances that are introduced at the particle contact points by surface oxide layers 172 and absorbed organic molecules or other surfactants 174.

It is the surface oxide layer 172 that rules out the use of most metals in electrically conductive polymers. For this reason aluminum powder cannot be used to make electrically conductive polymers because of the oxide film that insulates the particle contact points. Hence, silver and gold flakes and powders were used in our invention to provide stable resistivity values less than about 0.001 ohm/cm. Both, the silver and gold flakes and powders were purchased from Degussa Corporation's Electronic Materials Division, New Jersey. The size of the respective silver and gold flakes, respectively, were 0.6 and 1.1 microns.

The development of the metal/polymer adhesive material for our invention involved the mixing of the silver or gold flakes/powder with the resin system in a ratio ranging by weight from 1:0.5 to 1:2.0. Initially, the batch was thoroughly hand mixed followed by ultrasonic mixing for 3 to 5 minutes depending on the size of the batch. The mixed batch was placed in a vacuum degassing chamber under a pressure of 30 inches of mercury for about 15 to 20 minutes. The purpose of degassing was to completely eliminate air entrapments (air bubbles) from the batch.

The mixed batch was tested for mechanical and dielectric properties. For mechanical properties, lap shear tests were performed on aluminum specimens according to ASTM D 1002 using adhesive 42 to hold components together. For silver flakes the lap shear values were in the range of 1600 to 1900 psi. For gold flakes, the lap shear values were in the range of 2380 to 2750 psi.

The electrical conductivity of the metal polymer system was determined by measuring the resistivity of a bonded specimen according to ASTM D 150. A silver containing adhesive had a resistivity in the range of 0.000145 to 0.000510 ohm-cm.

An adhesive paste of the desired properties and consistency was made according to the above described procedure. The paste was carefully applied to the top of the thin walls of the web portions 120 and 122 of test apparatus 110 using several techniques. These techniques included silk screening, fine needle syringe application, and paint brush application. Cover plate 114 was then put in place and pressed firmly upon superstructure 112 using C-clamps. This assembly was then baked at 3500° F. for one hour, followed by natural cooling. FIGS. 6A and 6B show the front and rear views of this four cavity test filter apparatus 110.

Again, array 20 is constructed in a manner similar to that used to build test filter apparatus 110. A superstructure 22 has a cover plate 28 adhesively mounted thereto using electrically conductive adhesive 42. However, couplings, which are preferably capacitive and are similar to the coupling with lead 152 shown in FIG. 7, are incorporated into antenna elements 30 and amplifiers 33. These leads 152 are inserted in apertures of cover plate 28 and base portions 38 to provide input to and output from coupled cavities 40. Thus an array 20 can be made without using coaxial cables for connections between antenna elements 30, cavities 40 and amplifiers 33. Mechanically, antenna elements 30 and amplifiers 33 may be secured to cover plate 28 and superstructure 22 using conventional fasteners.

While in the foregoing specification this invention has been described in relation to a certain preferred embodiment thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A method of electrically connecting a pair of conductive plates, the method comprising:

mixing one of gold and silver particles with a resin into a mixture in a ratio ranging by weight from 1:0.5 to 1:2.0;

placing the mixture in a vacuum degassing chamber and degassing the mixture;

applying the mixture between a pair of conductive plates; and baking the plates and mixtures to form a hardened electrically conductive joint between the plates.

2. The method of claim 1 wherein:

the resin is a dysfunctional bisphenol/epicholorohydrin-derived liquid epoxy resin.

* * * * *